Feb. 26, 1957     L. L. JOHNSON     2,783,425
WARD LEONARD SPEED CONTROL SYSTEM
Filed Dec. 22, 1953
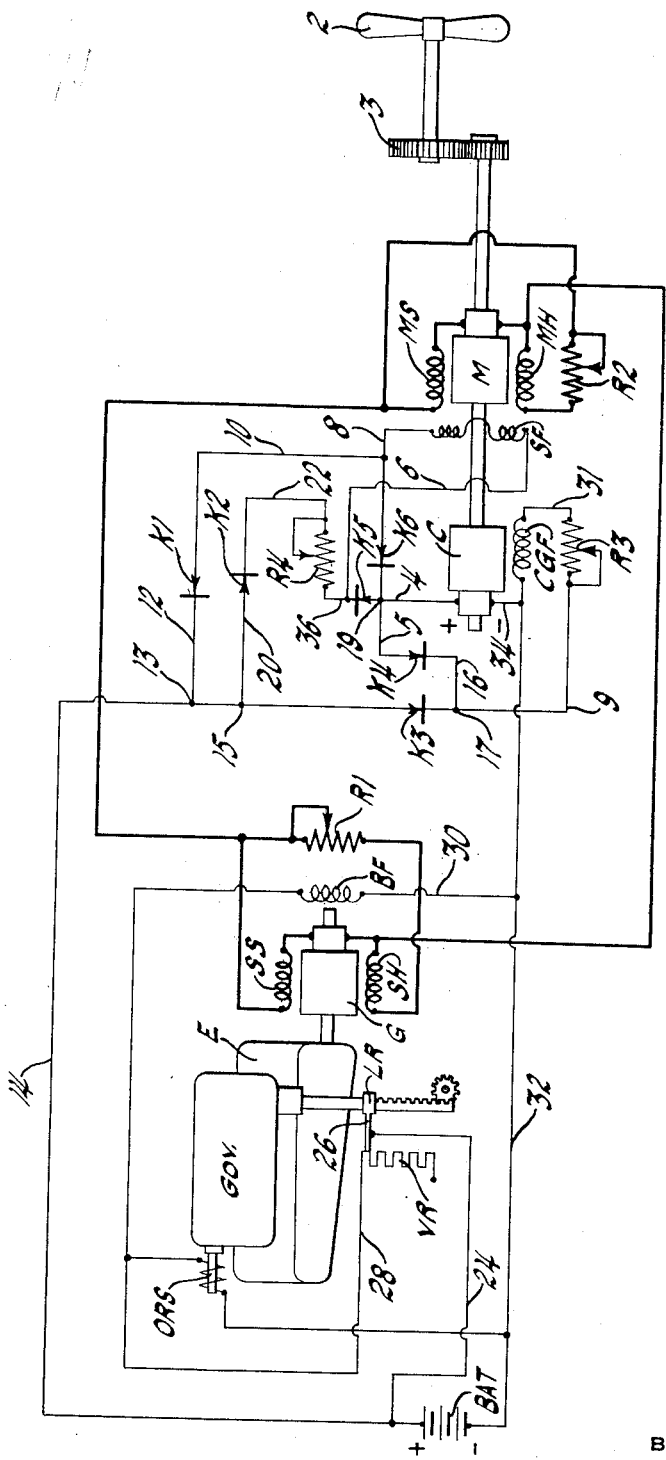
INVENTOR
*Lauren L. Johnson*
BY *S. C. Thorpe*
ATTORNEY

United States Patent Office 2,783,425
Patented Feb. 26, 1957

2,783,425

WARD LEONARD SPEED CONTROL SYSTEM

Lauren L. Johnson, Westchester, Ill., assignor to General Motors Corporation, Detroit, Mich., a corporation of Delaware Application December 22, 1953, Serial No. 399,651

4 Claims. (Cl. 318—146)

This invention relates generally to electrical systems utilizing dynamoelectric generators and motors for the conversion and transmission of power, and more particularly to means for regulating generator-motor sets in response to variations in the loads on the motors of these sets.

This invention is even more particularly related to the problems encountered in railway electric motor driven snow plows and, therefore, will be described in conjunction therewith.

Motor speed control means have previously been provided which will respond to extreme variations in the load applied to power driven generator-motor sets to thereby control these sets to maintain a more or less uniform speed of rotation and prevent injury thereto, all without any substantial loss of energy. However, in order for the railroads to use the control means mentioned for railroad snow plows, etc., they would have to purchase or acquire motors and generators specially suited to these means since the usual motor speed control means referred to are not adaptable for use with the types of motors and generators normally found in the electrical transmissions of diesel electric locomotives. For the railroads to purchase unusual snow plow equipment which they would be able to use only during certain seasons of the year is not considered economically feasible since, in the first place, this special equipment has a high initial cost, and, secondly, it continues to depreciate without use during the snowless periods of the year.

In developing a snow plow for railroad use and attempting to keep its cost at a minimum it has been proposed to keep the diesel engine and main generator, including the load regulator, intact in a locomotive unit and to add thereto suitable rotary plow equipment. To actually drive the plow rotor it is proposed to use a second main generator (readily available from a spare stock usually kept on hand) as a drive motor. It should be readily appreciated that if a suitable motor control can be found which enables the proposed snow plow drive to be used, a relatively inexpensive plow can be quickly made available whose drive components can be used in regular locomotive service during the snowless periods of the year.

In developing a drive for a device such as a snow plow there are certain requirements which must be met. For example, in order to protect certain mechanical portions of the plow a predetermined maximum speed should not be exceeded. To further protect mechanical portions of the plow a certain predetermined maximum torque should not be exceeded. It is, however, desirable that this maximum torque be obtainable anywhere from zero to rated power and speed of the plow. In addition to the above requirements the plow should have as nearly constant speed as possible from minimum power to the full rated power thereof and it should maintain its rated power output as the plow speed decreases from rated plow speed and its torque approaches maximum torque.

This latter requirement is met by the fact that the power supply for the plow is to be the usual locomotive diesel engine and main generator including the load regulator therefor. The load regulator (as in regular locomotives) controls generator excitation so as to maintain the power output of the generator constant when there is a decrease in plow speed from rated plow speed and an increase in torque toward maximum torque.

The requirement that the plow speed should be as nearly constant as possible from minimum power to full rated power may be generally satisfied by using a locomotive main generator which is already shunt excited as a shunt motor whose total pole flux varies in proportion to the magnitude of the supply voltage.

In order to meet the second requirement mentioned above, which is to obtain a relatively constant maximum plow torque from zero to rated power and speed of the plow, the product of the pole flux and the armature current of the drive motor must be constant. Since, as already mentioned, the load regulator provides for a relatively constant kilowatt output by reducing generator voltage upon increased current demand, some means is needed to provide the drive motor with additional excitation to make up for that lost due to a drop in supply voltage caused by a droop in plow speed as the load is increased. It will be readily appreciated that in spite of the fact that it is desired to hold the plow speed as constant as possible, some speed droop due to an increase in load torque demand is necessary in order to maintain system stability.

To make up the loss of motor excitation caused by the drop in generator voltage as described above, the present invention provides the drive motor with a separately excited field whose excitation varies inversely as motor speed. This is achieved by connecting the separately excited motor field to a fixed voltage reference and, also, to the output of a small control generator coupled to the drive motor. The excitation of the control generator is fixed so that control generator output is equal to the fixed voltage reference at rated speed and no separate excitation for the drive motor is provided.

In order to be sure that the plow speed does not exceed a predetermined maximum and to achieve plow motor speed control, the same separately excited motor field just mentioned is excited with the same polarity either above or below rated plow speed. This is accomplished in the present invention by using a full wave rectifier so that any difference between control generator voltage and the fixed reference voltage increases separate motor field excitation. Above rated plow motor speed, however, the fixed field excitation of the control generator is modified so that control generator voltage increases in large increments with small incremental increases in speed to very rapidly increase drive motor excitation, which tends to reduce drive motor speed.

For a further understanding of this invention and the objects thereof reference may be had to the accompanying detailed description and drawing, which is a schematic diagram of the plow and the control therefor.

Referring to the accompanying schematic diagram a diesel engine E is shown driving a main generator G. Both the diesel engine E and generator G, in the form shown, are standard components of the energy generating portion of a diesel-electric locomotive, but in the present instance are to be the energy generating electric power plant for a device such as a snow plow which is constantly subjected to extremely variable loads.

The diesel engine E is provided with the usual governor GOV which in conjunction with a load regulator LR maintains the speed of the engine and the power output of the generator relatively constant for a given throttle setting. This is accomplished by a battery field BF for the main generator which is connected in series electrical relationship with a variable resistance VR of load regulator LR and a voltage source such as battery BAT. When there is an increase in load on generator G, it tends to slow down its speed and that of engine E. The speed responsive portion of GOV tends to supply more fuel to maintain engine speed and also causes the load regulator to place more of its resistance VR in series with the battery field BF to reduce generator excitation and its power output to the value determined for the particular engine throttle setting.

In addition to battery field BF, generator G is also provided with a series field SS and a shunt field SH, whose excitation may be adjusted by means of a rheostat R1.

An overriding solenoid ORS is provided on the engine governor GOV which is energized if main generator separate field excitation becomes too high. Energization of ORS overrides the governor and starts moving more of resistance VR in series with field BF.

The plow comprises a plow rotor 2 which is driven through suitable reduction gearing 3 by a motor M. It will be noted that motor M is very similar to generator G and is also provided with similar series and shunt fields labeled MS and MH, respectively. The excitation of shunt field MH is adjustable by a rheostat R2. The motor M is connected to generator G to receive power therefrom for transmittal to plow rotor 2 by means of the heavy lines shown in the schematic diagram.

To achieve the desired drive control it will be observed that in addition to fields MS and MH, drive motor M is also provided with a separately excited field SF. Motor field SF receives its energy from two sources, the battery BAT and a small control generator C driven by motor M. The control generator C when motor M is operating at rated speed and below is essentially separately excited by a field CGF connected to battery BAT by means of conductor 14, a rectifier K3, conductor 9, rheostat R3, and conductors 31 and 32. If, however, the speed of motor M should increase above rated then the output of control generator C materially supplements the excitation thereof in a manner to be more particularly described shortly. The excitation of field CGF may be calibrated to the desired range of values (depending on the speed of control generator C) by the rheostat R3. A plurality of rectifiers K1 through K6 are provided to achieve the proper flow of current in the control portion of the system.

The operation of the snow plow drive is as follows:

Assuming the plow to be operating at rated speed and load for a fixed throttle setting of engine E, no current will flow through separately excited field SF because the output of control generator C has been adjusted by field rheostat R3 so that it is the same as the reference voltage which in this case is obtained from battery BAT. This may be appreciated by tracing the current path from the control generator C. Starting from the positive side thereof and following conductor 4, rectifier K5, conductors 36 and 6, field SF, conductors 8 and 10, rectifier K1 and conductor 12, the control generator potential is applied to junction 13, which is opposed by the battery BAT potential starting from the positive side thereof and following conductor 14 to junction 13. Similarly, starting from the positive side of control generator C and following conductors 4 and 5, rectifier K4 and a conductor 16, the control generator potential is applied to junction 17 and is opposed by the battery BAT potential from the positive side thereof through conductor 14, rectifier K3 and conductor 9 to junction 17. Since, as stated, the control generator output is the same as the voltage reference BAT, no current will flow to junction points 13 and 17 through conductors 12 and 16, respectively. No current can flow through conductors 12 and 16 away from junctions 13 and 17 because of the presence of rectifiers K1 and K4.

Since junction points 15 and 19 joined by a conductor 20, rectifier K2, conductor 22, rheostat R4 and conductors 36 and 4 are also at the same potential no current will flow therethrough.

If the load should be increased on rotor 2 and motor M slows down, the back voltage thereof will decrease and motor armature current will increase. The increase in motor armature current increases the load on generator G causing it and engine E to slow down. As E slows down, however, the speed responsive portion of the governor GOV changes the position of LR to place more resistance VR in series with the separately excited generator field BF. The circuit for accomplishing this result includes the positive side of battery BAT, conductors 14 and 24, rheostat arm 26, resistance VR, conductor 28, field BF, and conductors 30 and 32, returning to the negative side of battery BAT. This change in resistance VR by load regulator LR decreases the excitation of generator G and decreases its voltage so that the generator power output is the same as before the increase in load.

The increase in motor armature current increases the flux of series motor field MS and tends to increase the motor torque to take care of the added load. A decrease in the voltage of main generator G, however, reduces the excitation of motor shunt field MH and this results in a loss of motor torque.

The motor torque lost by the reduction in motor shunt field excitation is made up by the new drive control. As has been stated, control generator C is coupled to motor M and, consequently, when motor M slows down control generator C also slows down. This reduction is speed of control generator C reduces its output so that a difference of potential exists between junction point 19 and the junction points 13, 15, 17, with the higher potential being at these latter junctions. This difference of potential causes current to flow through motor field SF. Since no current can flow in conductors 12 and 16 away from junctions 13 and 17, however, this current must flow from junction 15, through conductor 20, rectifier K2, conductor 22, rheostat R4, conductor 36, conductor 6 (because of the presence of rectifier K5), field SF and conductor 8, rectifier K6 and conductor 5 to junction 19. This flow of current through field SF makes up for the field excitation and torque lost when the voltage of generator G is reduced and thus one important function of the new drive control has been achieved.

Let it be assumed that motor M and plow rotor 2 are again operating at rated speed and load so that no difference of potential is impressed across separately excited motor field SF and then the load on plow rotor 2 and motor M is reduced instead of increased. This reduction of load will cause an increase in motor speed and an increase in the back voltage thereof. This increase in back voltage decreases motor armature current and decreases the load on generator G. A reduction in the load of generator G causes its speed and that of engine E to increase. An increase in speed of engine E causes the speed responsive portion of governor GOV to decrease the resistance VR in series with generator battery field BF and increase the excitation and voltage of generator G until engine E is again turning at rated speed. An increase in main generator G voltage increases the excitation of motor shunt field MH which tends to increase motor back voltage and decrease motor speed. Because of the decrease in motor armature current due to increased back voltage, however, the excitation of motor series field MS is reduced tending to decrease back voltage and prevent motor speed from being reduced. With an increase in motor speed above rated, however, the output of control generator C will become greater. In fact, the output thereof will increase at a very rapidly increasing rate with increase in motor speed above rated, because the exciting field CGF for control generator C is no longer only excited essentially by battery BAT, but is substantially supplemented by the output of the control generator itself. This may be observed by tracing the circuit, including field CGF, which starts from the positive side of control generator C and comprises conductor 4, conductor 5, rectifier K4, conductors 16 and 9, rheostat R3, conductor 31, field CGF, and conductors 32 and 34, returning to the negative side of control generator C. The increased output of control generator C causes a difference of potential between junctions 19 and 13 with the higher potential being at junction 19. It will be noted that the polarity of this difference of potential is opposite to the polarity which was obtained between junctions 19 and 15 upon a decrease in motor speed below rated speed. (The potential of junction 13 is the same as that of junction 15.) Because of the presence of rectifiers K2, K3, and K5, however, the current flow caused by the higher potential at 19 is rectified so that it flows through separate motor field SF in the same direction as when motor speed was below rated motor speed. This flow of current is from junction 19 through conductor 4, rectifier K5, conductor 36, conductor 6, field SF, conductors 8 and 10, rectifier K1 and conductor 12 to junction 13. This flow of current substantially energizes field SF and materially increases motor M excitation. This large increase in excitation tends to substantially increase the back voltage of motor M and cause it to slow down to thereby achieve proper plow speed control which, as has been emphasized, is one of the most important purposes of the present invention.

It may now be appreciated that with the arrangement just described no close manual control of the power supply is needed and the usual locomotive power plant can be used to power the snow plow or other types of similar equipment with very minor modifications. Simply by adjusting the rheostats in the motor control circuit, different generator characteristics can be quickly and easily accommodated. The plow motor is readily available from spare equipment, always kept on hand for emergency or replacement use as a main generator in regular locomotive service.

I claim:

1. A power transmitting system including a main generator having driving means therefor, an electrical shunt excited motor connected in electrical circuit with the armature of said generator and rotatable by the power output of said generator, said motor having an armature operatively connected to means subject to variable loadings which cause changes in the load current of said motor, generator control means responsive to changes in the load current demand on said generator by said motor tending to maintain the power output and speed of said generator substantially constant by varying the voltage thereof, and motor control means responsive to a change in the speed of said motor tending to compensate for a change in motor shunt excitation caused by varying the voltage of said generator comprising a separately excited field for said motor, a fixed voltage reference in electrical circuit with said separately excited field and a control generator connected to said separately excited field and operatively coupled to said motor, full wave rectifying means in circuit with said fixed voltage reference and said control generator, said voltage reference and said control generator acting in opposition to each other through said rectifying means to supply a voltage of constant polarity to said separately excited field.

2. A power transmitting system including a main generator having driving means therefor, excitation means for said generator, an electrical motor connected in electrical circuit with the armature of said generator and rotatable by the output of said generator, excitation means for said motor including a shunt field and a separately excited field and a series field, said motor having an armature operatively connected to means subject to variable loadings which causes changes in the speed of rotation of said motor and current changes in said motor and generator armature, generator control means responsive to changes in the speed of said generator caused by said current changes tending to maintain said generator power output constant by varying the voltage thereof, and motor control means responsive to any change from a predetermined speed of rotation of said motor to increase the separate excitation of said motor so as to compensate for changes in motor shunt excitation caused by varying the voltage of said generator.

3. A power transmitting system including a main generator having driving means therefor, excitation means for said generator, an electrical motor connected in electrical circuit with the armature of said generator and rotatable by the output of said generator, excitation means for said motor including a shunt field and a separately excited field and a series field, said motor having an armature operatively connected to means subject to variable loadings which cause changes in the speed of rotation of said motor and in the current of said motor and generator armature, generator control means responsive to changes in the speed of said generator caused by said current changes tending to maintain said generator power output constant by varying the voltage thereof, and motor control means responsive to an increase in the speed of rotation of said motor above a predetermined speed of rotation to increase the separate excitation of said motor, said motor control means also being responsive to a decrease in the speed of rotation of said motor below said predetermined speed of rotation to increase the separate excitation of said motor, whereby changes in motor shunt excitation caused by varying the voltage of said generator tend to be compensated for and speed of said motor is controlled.

4. A power transmitting system including a main generator having driving means therefor, excitation means for said generator, an electrical motor connected in electrical circuit with the armature of said generator and rotatable by the output of said generator, excitation means for said motor including a shunt field and a separately excited field, said motor having an armature operatively connected to means subject to variable loadings which cause changes in the speed of rotation of said motor and changes in the current of said motor and generator armature, generator control means responsive to changes in the speed of said generator tending to maintain the power output of said generator substantially constant by varying the voltage thereof, and motor control means responsive to any change from a predetermined speed of rotation of said motor to increase the separate excitation of said motor so as to compensate for changes in motor shunt excitation caused by varying the voltage of said generator comprising a control generator operatively coupled to said motor for rotation thereby, a fixed voltage reference in electrical circuit with said separately excited field, said control generator being connected in electrical circuit with said fixed voltage reference and said separately excited field so that its voltage output opposes the voltage output of said fixed voltage reference and is equal to said fixed voltage reference when said motor is turning at said predetermined speed, and current rectifying means in circuit with said reference and control generator and separately excited field operable to apply a differential voltage of constant polarity to said separately excited field obtained when the speed of said motor differs from said predetermined speed.

References Cited in the file of this patent

UNITED STATES PATENTS

| | | |
|---|---|---|
| 1,943,498 | Ohlsen | Jan. 16, 1934 |
| 2,393,620 | Adams et al. | Jan. 29, 1946 |
| 2,604,616 | Edwards | July 22, 1952 |